United States Patent
Lin et al.

(10) Patent No.: US 11,024,164 B2
(45) Date of Patent: Jun. 1, 2021

(54) TRAFFIC INFORMATION PROCESSING METHOD AND RELATED DEVICE

(71) Applicant: Huawei Technologies Co., Ltd., Shenzhen (CN)

(72) Inventors: Yangbo Lin, Shenzhen (CN); Hui Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/818,554

(22) Filed: Mar. 13, 2020

(65) Prior Publication Data

US 2020/0219387 A1 Jul. 9, 2020

Related U.S. Application Data

(63) Continuation of application No. PCT/CN2018/102082, filed on Aug. 24, 2018.

(30) Foreign Application Priority Data

Sep. 14, 2017 (CN) .......................... 201710831841.0

(51) Int. Cl.
*G08G 1/01* (2006.01)
*G08G 1/09* (2006.01)

(52) U.S. Cl.
CPC ........... *G08G 1/0133* (2013.01); *G08G 1/091* (2013.01)

(58) Field of Classification Search
CPC .... G08G 1/0112; G08G 1/0116; G08G 1/012; G08G 1/0133; G08G 1/0145; G08G 1/091; G08G 1/096725; G08G 1/096741; G08G 1/09675; G08G 1/096775; G08G 1/096783; G08G 1/164; G08G 1/166; H04W 4/02; H04W 4/021; H04W 4/027; H04W 4/40; H04W 4/44; H04W 4/90; H04L 67/12
See application file for complete search history.

(56) References Cited

U.S. PATENT DOCUMENTS

2005/0221759 A1 10/2005 Spadafora et al.
2008/0074290 A1 3/2008 Woo et al.
(Continued)

FOREIGN PATENT DOCUMENTS

CN 101155002 A 4/2008
CN 103258428 A 8/2013
(Continued)

*Primary Examiner* — Orlando Bousono
(74) *Attorney, Agent, or Firm* — Leydig, Voit & Mayer, Ltd.

(57) ABSTRACT

The method includes: obtaining, by a first TCU, a traffic application type and first traffic information of a traffic target object; determining, by the first TCU, an interaction coverage area based on the traffic application type and the first traffic information of the traffic target object; determining, by the first TCU, a first area based on the interaction coverage area and a management area of the first TCU; determining, by the first TCU, a traffic participant object in the first area; and sending, by the first TCU, the first traffic information of the traffic target object to the traffic participant object; or receiving, by the first TCU, second traffic information sent by the traffic participant object, and sending the second traffic information to the traffic target object, so as to determine an interaction coverage area, and further accurately determine a traffic participant object in the interaction coverage area.

20 Claims, 5 Drawing Sheets

(56) References Cited

U.S. PATENT DOCUMENTS

| 2015/0310738 | A1 | 10/2015 | Karacan et al. |
| 2016/0155327 | A1 | 6/2016 | Schlienz et al. |
| 2017/0115663 | A1 | 4/2017 | Nordbruch |

FOREIGN PATENT DOCUMENTS

| CN | 105679061 A | 6/2016 |
| CN | 105872970 A | 8/2016 |
| CN | 106898149 A | 6/2017 |
| CN | 107093322 A | 8/2017 |
| CN | 107564306 A | 1/2018 |
| JP | 6171146 B2 | 8/2017 |

TRAFFIC INFORMATION PROCESSING METHOD AND RELATED DEVICE

CROSS-REFERENCE TO RELATED APPLICATIONS

This application is a continuation of International Application No. PCT/CN2018/102082, filed on Aug. 24, 2018, which claims priority to Chinese Patent Application No. 201710831841.0, filed on Sep. 14, 2017. The disclosures of the aforementioned applications are hereby incorporated by reference in their entireties.

TECHNICAL FIELD

Embodiments of the present invention relate to the field of electronic technologies, and in particular, to a traffic information processing method and a related device.

BACKGROUND

An intelligent transportation system (ITS) is a real-time, accurate, and efficient comprehensive transportation management system that effectively integrates an advanced information technology, a data communication transmission technology, an electronic sensor technology, a control technology, and a computer technology into an entire ground traffic management system and functions in a large range in an all-around manner. In this system, traffic information can be transmitted to a traffic participant object, for example, a pedestrian or a vehicle is notified of switching information of a signal light at an intersection.

However, in an existing technical solution, an intelligent transportation system sends information to traffic participant objects mainly in a broadcast manner. For example, to inform another related vehicle of information such as a current location, direction, and speed of a specific vehicle: based on a dedicated short range communications (DSRC) technology, the vehicle directly broadcasts the information to other vehicles around by using a wireless local area network; or based on a long term evolution for vehicle (LTE-V) technology, the vehicle submits the information to a base station by using a wireless cellular network and then the base station broadcasts the information to other vehicles around by using the wireless cellular network.

In this case, the traffic information may be transmitted to a traffic participant object that actually does not need the traffic information, but a traffic participant object that truly needs the traffic information cannot receive the traffic information. Therefore, how to precisely determine a traffic participant object and transmit traffic information in a targeted way is a problem worth considering.

SUMMARY

The embodiments of the present invention provide a traffic information processing method and a related device, to determine an interaction coverage area based on a traffic application type and first traffic information of a traffic target object, and further accurately determine a traffic participant object in the interaction coverage area. In this way, traffic information is transmitted in a targeted way, and a waste of communication and processing resources is effectively reduced.

According to a first aspect, an embodiment of the present invention provides an information processing method, including:

obtaining, by a first traffic control unit TCU, a traffic application type and first traffic information of a traffic target object, where the traffic application type is used to indicate a to-be-processed traffic scenario;

determining, by the first TCU, an interaction coverage area based on the traffic application type and the first traffic information of the traffic target object, where the interaction coverage area is used to indicate a geographical area related to the to-be-processed traffic scenario;

determining, by the first TCU, a first area based on the interaction coverage area and a management area of the first TCU, where the first area is an area in which the management area of the first TCU overlaps the interaction coverage area;

determining, by the first TCU, a traffic participant object in the first area; and sending, by the first TCU, the first traffic information of the traffic target object to the traffic participant object; or receiving, by the first TCU, second traffic information sent by the traffic participant object, and sending the second traffic information to the traffic target object.

In this technical solution, by determining the interaction coverage area corresponding to the traffic scenario, the first TCU can accurately determine the traffic participant object related to the traffic scenario in the management area of the first TCU and provide interaction support for the traffic participant object. In this way, traffic information is transmitted in a targeted way, and a waste of communication and processing resources is effectively reduced.

In a possible implementation scenario, the method further includes:

determining, by the first TCU, a second area based on the interaction coverage area and the management area of the first TCU, where the second area is an area that does not overlap the management area of the first TCU and that is in the interaction coverage area; and sending, by the first TCU, the traffic application type and the first traffic information of the traffic target object to a TCU adjacent to the first TCU.

In this technical solution, when determining that an area that does not overlap the management area of the first TCU exists in the interaction coverage area, the first TCU may send the traffic application type and the first traffic information of the traffic target object to the TCU adjacent to the first TCU, so that the TCU adjacent to the first TCU can continue to determine the interaction coverage area and provide interaction support for the related traffic participant.

In a possible implementation scenario, the method further includes:

determining, by the first TCU, a second area based on the interaction coverage area and the management area of the first TCU, where the second area is an area that does not overlap the management area of the first TCU and that is in the interaction coverage area; and sending, by the first TCU, the traffic application type and the first traffic information of the traffic target object to a second TCU, where the second TCU is a TCU in TCUs adjacent to the first TCU, and there is an overlapping area between a management area of the TCU and the interaction coverage area.

In this technical solution, when determining that an area that does not overlap the management area of the first TCU exists in the interaction coverage area, the first TCU may send, based on a status learned by the first TCU of the management area of the TCU adjacent to the first TCU, the traffic application type and the first traffic information of the traffic target object to the TCU (namely, the second TCU) in the TCUs adjacent to the first TCU, where there is an overlapping area between the management area of the TCU and the interaction coverage area. In this way, the second TCU can continue to determine the interaction coverage area and provide interaction support for the related traffic participant object.

In a possible implementation scenario, before the sending, by the first TCU, the traffic application type and the first traffic information of the traffic target object to a TCU adjacent to the first TCU, the method further includes:

obtaining, by the first TCU, an identifier of the TCU adjacent to the first TCU.

In a possible implementation scenario, before the sending, by the first TCU, the traffic application type and the first traffic information of the traffic target object to a second TCU, the method further includes:

obtaining, by the first TCU, an identifier and the management area of the TCU adjacent to the first TCU.

In a possible implementation scenario, after the sending, by the first TCU, the traffic application type and the first traffic information of the traffic target object to a TCU adjacent to the first TCU, the method further includes:

receiving, by the first TCU, a first message sent by the TCU adjacent to the first TCU, where the first message is used to indicate that the TCU adjacent to the first TCU has acknowledged receiving of the traffic application type and the first traffic information of the traffic target object.

In a possible implementation scenario, after the sending, by the first TCU, the traffic application type and the first traffic information of the traffic target object to a second TCU, the method further includes:

receiving, by the first TCU, a second message sent by the second TCU, where the second message is used to indicate that the second TCU has acknowledged receiving of the traffic application type and the first traffic information of the traffic target object.

In a possible implementation scenario, the obtaining, by a first traffic control unit TCU, a traffic application type and first traffic information of a traffic target object includes:

obtaining, by the first TCU, the first traffic information of the traffic target object and the traffic application type based on a preset condition;

receiving, by the first TCU, the first traffic information of the traffic target object, and determining the traffic application type based on the first traffic information of the traffic target object; or determining, by the first TCU, the first traffic information of the traffic target object and the traffic application type based on a received traffic application request of the traffic target object, where the traffic application request includes the first traffic information of the traffic target object and a request type, and the request type is used to indicate the traffic application type.

In a possible implementation scenario, the obtaining, by a first traffic control unit TCU, a traffic application type and first traffic information of a traffic target object includes:

receiving, by the first TCU, the traffic application type and the first traffic information of the traffic target object that are sent by a third TCU adjacent to the first TCU; and the sending, by the first TCU, the traffic application type and the first traffic information of the traffic target object to a TCU adjacent to the first TCU includes:

sending, by the first TCU, the traffic application type and the first traffic information of the traffic target object to a TCU, other than the third TCU, adjacent to the first TCU.

In a possible implementation scenario, the obtaining, by a first traffic control unit TCU, a traffic application type and first traffic information of a traffic target object includes:

receiving, by the first TCU, the traffic application type and the first traffic information of the traffic target object that are sent by a third TCU adjacent to the first TCU; and the sending, by the first TCU, the traffic application type and the first traffic information of the traffic target object to a second TCU includes:

sending, by the first TCU, the traffic application type and the first traffic information of the traffic target object to the second TCU other than the third TCU.

In a possible implementation scenario, the receiving, by the first TCU, second traffic information sent by the traffic participant object, and sending the second traffic information to the traffic target object includes:

receiving, by the first TCU, the second traffic information sent by the traffic participant object; and sending, by the first TCU, the second traffic information to the traffic target object by using the third TCU.

In a possible implementation scenario, the first traffic information of the traffic target object includes location information of the traffic target object; or the first traffic information of the traffic target object includes location information and status information of the traffic target object.

In a possible implementation scenario, the location information of the traffic target object is a current location of the traffic target object; and the determining, by the first TCU, an interaction coverage area based on the traffic application type and the first traffic information of the traffic target object includes:

determining, as the interaction coverage area by the first TCU based on the traffic application type and map information, a geographical area within a first distance threshold, with the current location of the traffic target object as a start point, where the first distance threshold is determined based on the traffic application type.

In a possible implementation scenario, the determining, by the first TCU, a traffic participant object in the first area includes:

determining, by the first TCU, a communication-enabled object that appears in the first area within a preset time as the traffic participant object.

In a possible implementation scenario, after the sending, by the first TCU, the first traffic information of the traffic target object to the traffic participant object, the method further includes:

receiving, by the first TCU, a third message sent by the traffic participant object, where the third message is used to indicate that the traffic participant object has acknowledged receiving of the first traffic information of the traffic target object.

In a possible implementation scenario, after the receiving, by the first TCU, the second traffic information sent by the traffic participant object, the method further includes:

sending, by the first TCU, a fourth message to the traffic participant object, where the fourth message is used to indicate that the first TCU has acknowledged receiving of the second traffic information.

In a possible implementation scenario, before the receiving, by the first TCU, the second traffic information sent by the traffic participant object, the method further includes:

sending, by the first TCU, indication information to the traffic participant object, where the indication information is used to instruct the traffic participant object to send the second traffic information to the first TCU.

In a possible implementation scenario, the second traffic information includes location information of the traffic participant object; or the second traffic information includes location information and status information of the traffic participant object.

According to a second aspect, the present invention provides a traffic control apparatus. The traffic control apparatus includes:

a processing module, configured to: obtain a traffic application type and first traffic information of a traffic target object, where the traffic application type is used to indicate a to-be-processed traffic scenario; determine an interaction coverage area based on the traffic application type and the first traffic information of the traffic target object, where the interaction coverage area is used to indicate a geographical area related to the to-be-processed traffic scenario; determine a first area based on the interaction coverage area and a management area of the first TCU, where the first area is an area in which the management area of the first TCU overlaps the interaction coverage area; and determine a traffic participant object in the first area; and a transceiver module, configured to send the first traffic information of the traffic target object to the traffic participant object; or receive second traffic information sent by the traffic participant object, and send the second traffic information to the traffic target object.

Optionally, the traffic control apparatus may further implement some or all of the optional implementations of the first aspect.

According to a third aspect, the present invention provides a traffic control unit. The traffic control unit includes a memory configured to store computer executable program code, a transceiver, and a processor, where the processor is coupled to the memory and the transceiver. The computer executable program code stored in the memory includes an instruction. When the processor executes the instruction, the traffic control unit is enabled to perform the method performed by the traffic control unit according to the first aspect.

According to a fourth aspect, the present invention provides a computer program product, where the computer program product includes computer program code, and when the computer program code runs on a computer, the computer is enabled to perform the method according to any one of the possible implementations of the first aspect.

According to a fifth aspect, the present invention provides a computer readable medium, where the computer readable medium stores computer program code, and when the computer program code runs on a computer, the computer is enabled to perform the method according to the implementations of the first aspect.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes embodiments of the present invention with reference to the accompanying drawings in the embodiments of the present invention.

Figure 1:
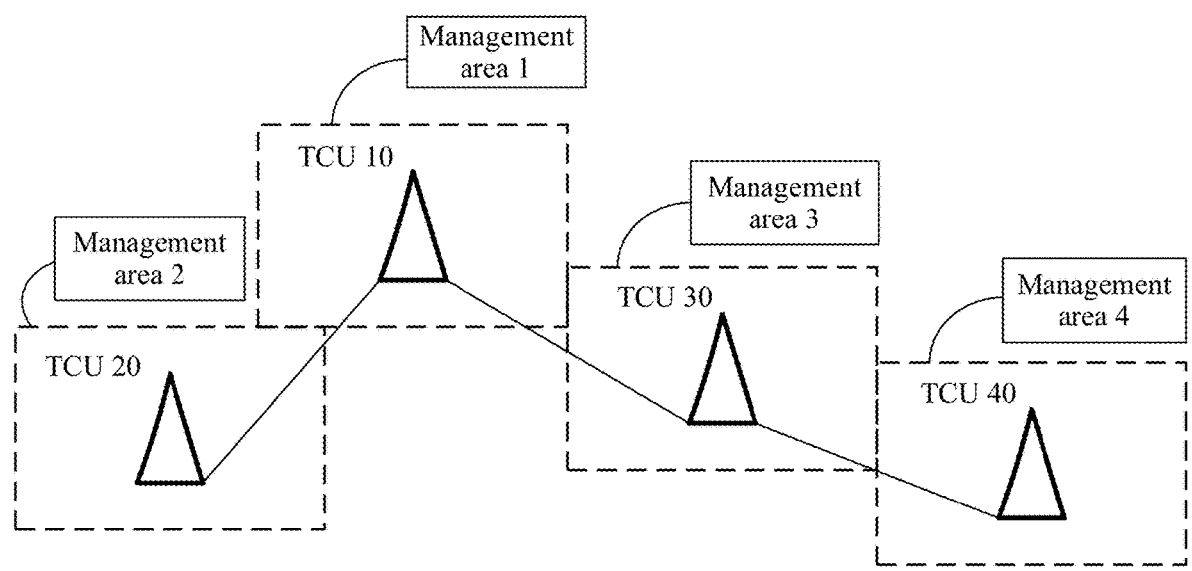
FIG. 1 is a schematic architectural diagram of an intelligent transportation system according to an embodiment of the present invention.

FIG. 1 is a schematic architectural diagram of an intelligent transportation system according to an embodiment of the present invention. The intelligent transportation system includes at least one traffic control unit (TCU), and each traffic control unit has a corresponding management area. The TCU is mainly responsible for coordinating activities of traffic participant objects in the management area of the TCU, and communicating with an adjacent TCU. The traffic participant object may include a vehicle, a roadside infrastructure, a pedestrian, or the like. The adjacent TCU is a TCU corresponding to a management area adjacent to the management area corresponding to the TCU.

The intelligent transportation system shown in FIG. 1 includes a TCU 10, a TCU 20, a TCU 30, and a TCU 40. Management areas corresponding to the TCU 10, the TCU 20, the TCU 30, and the TCU 40 are respectively a management area 1, a management area 2, a management area 3, and a management area 4. Using the TCU 10 as an example, the TCU 10 is responsible for coordinating activities of traffic participant objects in the management area 1, and communicating with the TCU 20 and the TCU 30 that are adjacent to the TCU 10.

Based on this system architecture, in a possible design, when being deployed or updated, each TCU may notify its own identifier to an adjacent TCU, so that the TCU can learn existence of the adjacent TCU. In another possible design, when being deployed or updated, each TCU may notify its own identifier and management area to each adjacent TCU, so that the TCU can learn the adjacent TCU and a management area of the adjacent TCU.

The traffic scenario in the embodiments of the present invention may include but is not limited to: a traffic signal notification scenario, in which a vehicle and a pedestrian that are to enter an intersection need to be notified of switching information of a traffic signal light of the intersection; a congestion-ahead reminder scenario, in which a vehicle and a pedestrian within a specific distance or within a specific quantity of intersections need to be notified of current congestion information; a dangerous obstacle warning scenario, in which a vehicle and a pedestrian within a specific distance or within a specific quantity of intersections need to be notified of current dangerous obstacle information; an emergency vehicle reminder scenario, in which a vehicle and a pedestrian in a driving direction of an emergency vehicle and within a specific distance from a current location need to be notified of the emergency vehicle; a vulnerable traffic participant object warning scenario, in which a vehicle and a pedestrian on a road around a vulnerable traffic participant object, in a direction towards the vulnerable traffic participant object, and within a specific distance from the vulnerable traffic participant object need to be notified of a current location of the vulnerable traffic participant object; a vehicle collision prevention scenario, in which a specific vehicle needs to be alerted to information about an article that is near the vehicle and whose motion status may incur a collision risk.

Figure 2:
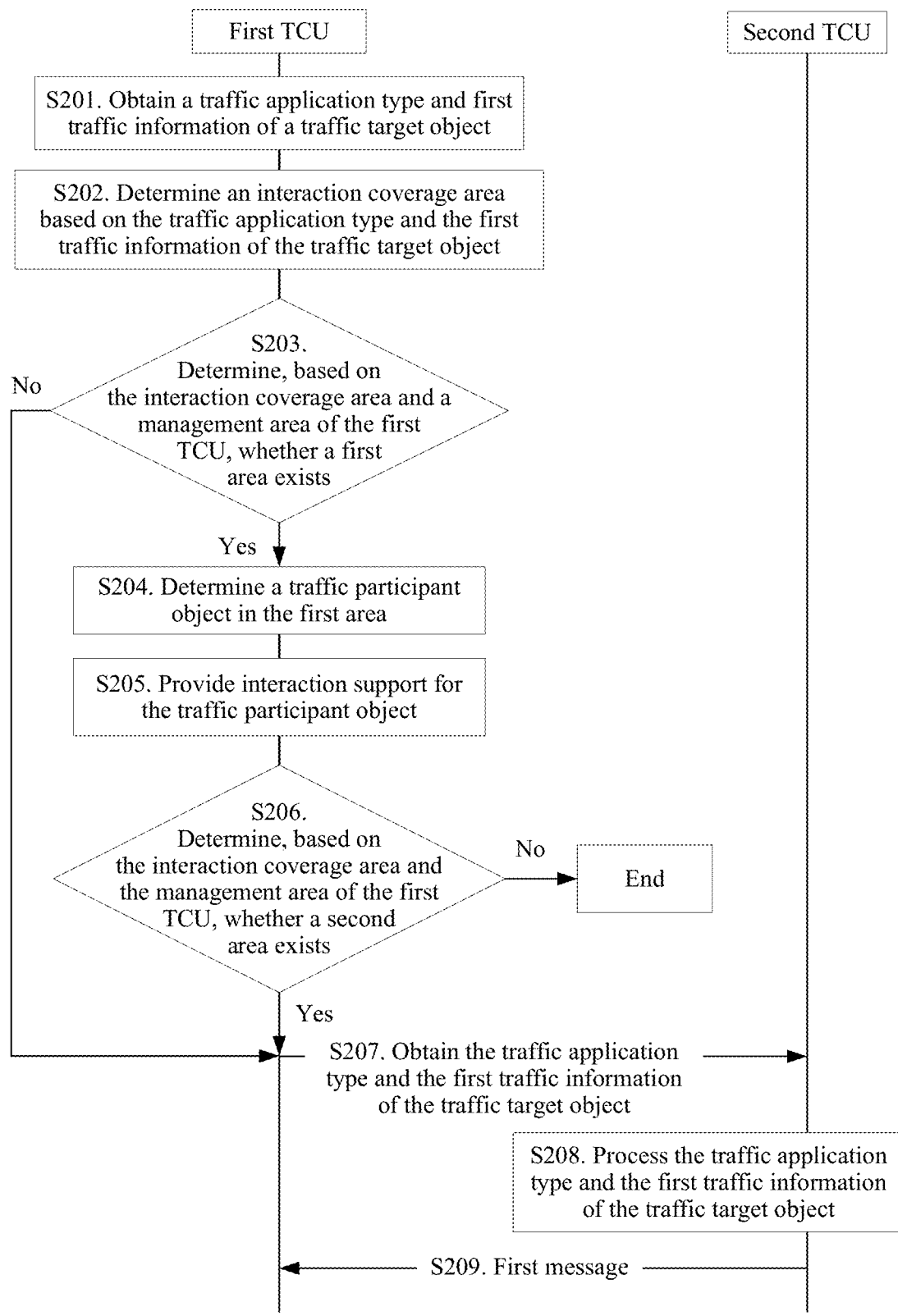
FIG. 2 is a schematic flowchart of a traffic information processing method according to an embodiment of the present invention.

FIG. 2 is a schematic flowchart of a traffic information processing method according to an embodiment of the present invention. The method includes but is not limited to the following steps.

S201. A first TCU obtains a traffic application type and first traffic information of a traffic target object.

The traffic application type is used to indicate a to-be-processed traffic scenario. For example, a traffic application type of an emergency vehicle reminder indicates that the to-be-processed traffic scenario of the first TCU is as follows: The first TCU needs to remind other vehicles in a driving direction of an emergency vehicle so that the other vehicles give way to the emergency vehicle. The first traffic information is information about the traffic target object, where the traffic target object may be an object such as a pedestrian, a vehicle, or a traffic infrastructure. The first traffic information of the traffic target object may include all kinds of traffic information related to the traffic target object, for example, may include information about an identifier, a location, and a status of the traffic target object, or may include traffic environment information, disaster information, and the like.

The first TCU may obtain the traffic application type and the first traffic information of the traffic target object in the following possible implementation scenarios:

In a first possible implementation scenario, S201 may be specifically: The first TCU obtains the first traffic information of the traffic target object and the traffic application type based on a preset condition.

The preset condition may be a scheduled time, an information type, an instruction type, or the like that is preset in the first TCU. When detecting that the preset condition is met, the first TCU may trigger an action of obtaining the first traffic information of the traffic target object and the traffic application type. For example, the preset condition is reaching a preset first time. In this case, the first TCU may obtain the first traffic information of the traffic target object and the traffic application type when the first time is reached.

The first traffic information of the traffic target object may be collected in advance by the first TCU by using the traffic target object, another TCU, a network unit, or the like. This is not specifically limited herein.

After obtaining first traffic information, the first TCU may determine a corresponding traffic application type by analysis, or may determine a traffic application type based on a preset condition. The traffic application type herein may be represented by using an identifier of the traffic application type. Therefore, the first TCU may obtain the traffic application type and the first traffic information of the traffic target object. For example, when the first traffic information is related information about a location, a status, or the like of an emergency vehicle, the first TCU may determine, based on the first traffic information, that the traffic application type is an emergency vehicle reminder application type.

Further, the first TCU may create, based on the traffic application type and the first traffic information of the traffic target object, a traffic application instance corresponding to the traffic application type. The traffic application instance is one actual operation of a traffic application, for example, one operation of a traffic signal notification application is an instance of the traffic signal notification application. In an instance creation process, the first TCU may allocate an instance identifier to the traffic application instance, where the instance identifier may uniquely indicate the traffic application instance.

For example, if the first traffic information carries traffic signal information (an identifier, a location, a phase status, remaining duration of a current phase status, and the like), the first TCU may determine through analysis that a traffic application type corresponding to the first traffic information is a traffic signal light information notification application type, create a traffic signal notification application instance, and allocate an instance identifier of the traffic signal notification application instance.

In a second possible implementation scenario, S201 may be specifically: The first TCU receives the first traffic information of the traffic target object, and determines the traffic application type based on the first traffic information of the traffic target object.

The first TCU may determine, through analysis based on content in the received first traffic information, a traffic application type corresponding to the first traffic information. Therefore, the first TCU may obtain the traffic application type and the first traffic information of the traffic target object. Further, the first TCU may create, based on the traffic application type and the first traffic information of the traffic target object, a traffic application instance corresponding to the traffic application type.

In a third possible implementation scenario, S201 may be specifically: The first TCU determines the first traffic information of the traffic target object and the traffic application type based on a received traffic application request of the traffic target object.

The traffic application request may include the first traffic information of the traffic target object and a request type, and the request type is used to determine the traffic application type.

After receiving the traffic application request of the traffic target object, the first TCU may determine the corresponding traffic application type based on the request type in the traffic application request. Therefore, the first TCU may obtain the traffic application type and the first traffic information of the traffic target object. For example, the request type in the traffic application request is a path planning service request, the first TCU may determine, based on the path planning service request, that the corresponding traffic application type is a road condition query application type. Further, the first TCU may create, based on the traffic application type and the first traffic information of the traffic target object, a traffic application instance corresponding to the traffic application.

It should be noted that the traffic application request of the traffic target object may be sent by the traffic target object to the first TCU, or may be sent by another traffic object to the first TCU. For example, when the traffic target object is a vehicle, and wants to learn article information of a nearby dead zone, the traffic target object may directly send, to the first TCU, a traffic application request whose request type is a dead zone article warning; when the traffic target object is a disabled and another traffic object is a roadside monitoring device, and when detecting that a disabled appears, the monitoring device may send a traffic application request, whose application type is disabled reminder, specific to the traffic target object (the disabled) to the first TCU.

In a fourth possible implementation scenario, S201 may be specifically: The first TCU receives the traffic application type and the first traffic information of the traffic target object from a third TCU adjacent to the first TCU.

The traffic application type and the first traffic information of the traffic target object may be sent to the first TCU after the third TCU adjacent to the first TCU initially triggers the traffic application instance and determines the traffic application type and the first traffic information of the traffic target object. Alternatively, the third TCU adjacent to the first TCU may receive the traffic application type and the first traffic information of the traffic target object that are sent by a TCU adjacent to the third TCU, and then transfer the traffic application type and the first traffic information of the traffic target object to the first TCU. Therefore, the first TCU may directly obtain the traffic application type and the first traffic information of the traffic target object.

Further, the first TCU may create, based on the traffic application type and the first traffic information of the traffic target object, a traffic application instance corresponding to the traffic application. It should be noted that in the implementation scenario, the third TCU adjacent to the first TCU may further send, to the first TCU, an instance identifier allocated when the traffic application instance is created. Therefore, when creating a traffic application instance, the first TCU does not need to allocate a new instance identifier. Optionally, when creating a traffic application instance, the first TCU may allocate a physical resource to the traffic application instance, such as a memory resource, a processing unit (CPU) resource, or a storage resource.

S202. The first TCU determines an interaction coverage area based on the traffic application type and the first traffic information of the traffic target object.

The interaction coverage area is used to indicate a geographical area in a to-be-processed traffic scenario. For example, the to-be-processed traffic scenario is a traffic signal light information notification scenario, and a related geographical area may be some areas in roads controlled by a traffic signal light, and the areas may be the interaction coverage area.

After determining the traffic application type and the first traffic information of the traffic target object, the first TCU may determine the interaction coverage area based on the traffic application type and the first traffic information of the traffic target object. In specific implementation, the first TCU may determine the interaction coverage area based on the traffic application type, the first traffic information of the traffic target object, and map information. The first traffic information may include location information of the traffic target object, or may include location information and status information of the traffic target object.

In a possible implementation scenario, the first traffic information may include the location information of the traffic target object, and the location information of the traffic target object may be specifically a current location of the traffic target object. The first TCU determines, as the interaction coverage area of traffic application based on the traffic application type, the first traffic information of the traffic target object, and the map information, a geographical area within a first distance threshold, with the current location of the traffic target object as a start point. The first distance threshold may be determined based on the traffic application type, in other words, different traffic application types may correspond to different first distance thresholds.

Specifically, the current location of the traffic target object determines the start point of the interaction coverage area, and the traffic application type may determine the first distance threshold. In this case, the first TCU may determine, as the interaction coverage area based on the traffic application type in combination with the map information, an area obtained by extending the start point towards a specific direction or a specific road by the first distance threshold, that is, the geographical area within the first distance threshold, with the current location of the traffic target object as the start point.

For example, it is assumed that the traffic target object is a traffic signal light S, the traffic application type is the traffic signal light information notification application type, and the location information of the traffic target object is a current location A of the traffic signal light S. It is assumed that the traffic signal light information notification application type indicates that an area within S2 km (the first distance threshold) from a specific traffic signal light on a road controlled by the traffic signal light is used as the interaction coverage area. In this case, the first TCU may use a current location a of the traffic signal light S as the start point, and with reference to the map information, determine a geographical area within S2 km from the traffic signal light S on the road controlled by the traffic signal light S, and determine the geographical area as an interaction coverage area corresponding to a traffic scenario indicated by the traffic signal light information notification application type.

In another possible implementation scenario, the first traffic information may include the location information and the status information of the traffic target object. The status information may indicate a speed, an angular speed, acceleration, a motion direction, or the like. The first TCU determines, as the interaction coverage area based on the traffic application type, the first traffic information of the traffic target object, and the map information, a geographical area within the first distance threshold in a specific direction, with the current location of the traffic target object as the start point. Different from the previous possible implementation scenario, interaction coverage area parameters, such as the first distance threshold and the specific direction used for extension performed by using the current location of the traffic target object as the start point are determined based on the traffic application type and the map information with reference to the status information of the traffic target object.

For example, it is assumed that the traffic target object is an emergency vehicle E, the traffic application type is the emergency vehicle reminder application type, the location information of the traffic target object is a current location b of the emergency vehicle E, and the status information includes a driving direction, a driving speed, driving acceleration, and the like of the emergency vehicle E. It is assumed that the emergency vehicle reminder application type indicates that an area to be reached by an emergency vehicle in five minutes is used as the interaction coverage area. In this case, the first TCU may use the current location b of the emergency vehicle E as the start point; based on the driving speed, the driving acceleration, and the like of the emergency vehicle, determine that a driving distance of the emergency vehicle E in five minutes is 1 km; and with reference to the map information and the driving direction of the emergency vehicle E, determine a geographical area b1 km away from the current location b of the emergency vehicle E in the driving direction of the emergency vehicle E on a road on which the emergency vehicle is driving as the interaction coverage area that corresponds to a traffic scenario indicated by the emergency vehicle reminder application type.

S203. The first TCU determines, based on the interaction coverage area and a management area of the first TCU, whether a first area exists, where if the first area exists, the first TCU performs S204, or if the first area does not exist, the first TCU performs S207.

The first area is an area in which the management area of the first TCU overlaps the interaction coverage area. The first TCU may compare the management area of the first TCU with the interaction coverage area, to determine whether there is an overlapping area between the management area of the first TCU and the interaction coverage area. If there is an overlapping area, the first TCU determines that the first area exists, and performs step 204; if there is no overlapping area, the first TCU determines that the first area does not exist, sends the traffic application type and the first traffic information of the traffic target object to a second TCU, and performs S207. A definition of the second TCU is described in detail in S207. In this embodiment of the present invention, the management area of the first TCU may be specified when the first TCU is deployed, so that the first TCU can learn its own management area.

S204. The first TCU determines a traffic participant object in the first area.

The traffic participant object may be a traffic participant object related to the traffic application type and the first traffic information of the traffic target object in the first area determined by the first TCU. Optionally, the traffic participant object may be a traffic participant object that appears in the first area within a specific time range in which the traffic application type and the first traffic information of the traffic target object are obtained, or may be several types of traffic participant objects specific to the traffic application type, for example, a traffic signal light. This is not specifically limited herein.

Optionally, the first TCU may determine a communication-enabled object that appears in the first area within a preset time as the traffic participant object. The preset time may be a period of time starting from a current moment, and the communication-enabled object is an object that has a communication function of sending a message to and receiving a message from the first TCU. Because time validity varies with first traffic information, different preset times may be set for different application types and different first traffic information. For example, the first traffic information is natural disaster information. In this case, a traffic participant object that appears in the first area within three hours or five hours starting from a current moment may be determined as the traffic participant object. For another example, the first traffic information is traffic signal light information. In this case, a traffic participant object that appears in the first area within remaining duration (30 seconds, 50 seconds, or the like) of a current phase status of a traffic signal light starting from a current moment may be determined as the traffic participant object.

Further, after S203 or S204, S206 may be performed to determine whether the interaction coverage area exceeds the management area of the first TCU.

S205. The first TCU provides interaction support for the traffic participant object.

The interaction support in this embodiment of the present invention may include the following: The first TCU sends the first traffic information of the traffic target object to the traffic participant object; or the first TCU receives second traffic information from the traffic participant object, and sends the second traffic information to the traffic target object. For a specific implementation, refer to detailed descriptions in FIG. 3a and FIG. 3b.

Optionally, the first TCU may determine, based on the traffic application type, to provide interaction support for the traffic participant object. For example, if the traffic application type is a to-be-processed traffic signal light notification scenario, used interaction support is sending the first traffic information to the traffic participant object; or if the traffic application type is a to-be-processed dead zone article warning scenario, used interaction support is receiving the second traffic information sent by the traffic participant object, and sending the second traffic information to the traffic target object.

Therefore, the first TCU can accurately determine, by determining an interaction coverage area corresponding to a traffic scenario, the traffic participant object, truly related to the traffic scenario, in the management area of the first TCU, and provide interaction support. In this way, traffic information is transmitted in a targeted way.

Further, S206 is further included after S205.

S206. The first TCU determines, based on the interaction coverage area and the management area of the first TCU, whether a second area exists, and if the second area exists, performs S207.

The second area is an area that does not overlap the management area of the first TCU and that is in the interaction coverage area. The first TCU may compare the management area of the first TCU with the interaction coverage area, to determine whether there is an area that does not overlap the management area of the first TCU and that is in the interaction coverage area. If there is an area that does not overlap the management area of the first TCU, that is the second area exists, step 207 is performed.

S207. The first TCU sends the traffic application type and the first traffic information of the traffic target object to the second TCU.

Due to two system architecture deployment designs in a system structure, the second TCU in the present invention also has two meanings.

In a first design, the first TCU knows existence of only the management area of the first TCU and a TCU adjacent to the first TCU, and does not know a management area corresponding to the TCU adjacent to the first TCU. Therefore, the second TCU herein may be all TCUs adjacent to the first TCU. Therefore, in this embodiment, the first TCU sends the traffic application type and the first traffic information of the traffic target object to the second TCU. In other words, the first TCU sends the traffic application type and the first traffic information of the traffic target object to all the TCUs adjacent to the first TCU.

In a second design, the first TCU knows management areas corresponding to the first TCU and all TCUs adjacent to the first TCU. Therefore, the first TCU may determine a TCU in the TCUs adjacent to the first TCU as the second TCU, where there is an overlapping area between the management area of the TCU and the interaction coverage area. In other words, there is an overlapping area between the management area of the second TCU and the interaction coverage area in this implementation scenario.

It should be noted that in the fourth possible implementation scenario mentioned in S201, the first TCU receives the traffic application type and the first traffic information of the traffic target object from the third TCU adjacent to the first TCU. In this implementation scenario, the first TCU may determine the second TCU from a TCU, other than the third TCU, adjacent to the first TCU. Specifically, in the first design, the first TCU sends the traffic application type and the first traffic information of the traffic target object to a TCU, other than the third TCU, adjacent to the first TCU. In the second design, the first TCU sends the traffic application type and the first traffic information of the traffic target object to the second TCU other than the third TCU. In other words, the first TCU no longer returns the traffic application type and the first traffic information of the traffic target object to the third TCU, to avoid a waste of communication and processing resources.

Further, the first TCU may further send, to the second TCU, an instance identifier allocated by the first TCU or an instance identifier obtained from the third TCU. Optionally, the first TCU may further send, to the second TCU, other traffic environment information that is related to the traffic scenario and that is learned by the first TCU.

Further, when a TCU adjacent to the first TCU is updated, the TCU may send an updated identifier, or the updated identifier and a management area to the first TCU.

S208. The second TCU processes the traffic application type and the first traffic information of the traffic target object.

For a process in which the second TCU processes the traffic application type and the first traffic information of the traffic target object, refer to S202 to S208.

Therefore, when determining that an area that does not overlap the management area of the first TCU exists in the interaction coverage area, the first TCU may send, based on a status learned by the first TCU of the management area of the TCU adjacent to the first TCU, the traffic application type and the first traffic information of the traffic target object to the TCU adjacent to the first TCU or the TCU (namely, the second TCU) in the TCUs adjacent to the first TCU, where there is an overlapping area between the management area of the TCU and the interaction coverage area. In this case, the second TCU or the TCU adjacent to the first TCU can continue to determine the interaction coverage area and provide interaction support for a related traffic participant object.

Further, after S208, the method may further include:

S209. The second TCU sends a first message to the first TCU.

The first message is used to instruct the second TCU to determine that the traffic application type and the first traffic information of the traffic target object have been received. With such a feedback mechanism, the first TCU does not need to start a process such as retransmission. It should be noted that the second TCU herein also includes the two designs of the second TCU described in step S207.

In this embodiment of the present invention, by determining an interaction coverage area corresponding to a traffic scenario, the first TCU can accurately determine a traffic participant object, related to the traffic scenario, in the management area of the first TCU and provide interaction support for the traffic participant object. In this way, traffic information is transmitted in a targeted way, and a waste of communication and processing resources is effectively reduced.

Figure 3A:
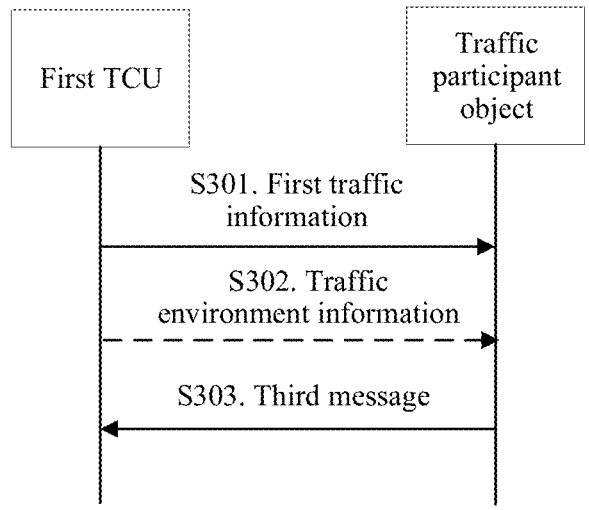
FIG. 3a is a schematic flowchart of interaction support provision according to an embodiment of the present invention.

In this embodiment of the present invention, for details of step S205 in which the first TCU provides interaction support for the traffic participant object, refer to any one of the implementations in FIG. 3a and FIG. 3b, which are specifically described as follows:

FIG. 3a is a schematic flowchart of interaction support provision according to an embodiment of the present invention. In an implementation scenario in FIG. 3a, that the first TCU provides interaction support for the traffic participant object means that the first TCU sends the first traffic information of the traffic target object to the traffic participant object. Specifically, the following steps S301 to S303 may be performed.

S301. The first TCU sends the first traffic information of the traffic target object to the traffic participant object.

In step S201 in which the first TCU obtains the traffic application type and the first traffic information of the traffic target object, it can be learned that the first TCU may obtain the first traffic information in different manners. Details are not described herein again. The first traffic information is sent to the traffic participant object so that the traffic participant object can effectively use the first traffic information.

For example, if the first traffic information is information about a congested location ahead, and the traffic participant object is a nearby vehicle, the first TCU may send the information about the congested location ahead to the nearby vehicle, so that after the traffic participant object receives the information, a user of the vehicle may determine, based on a location and a requirement of the user, whether to adjust a forward path.

In a possible implementation scenario, the first TCU sends first traffic information processed by the first TCU. For example, if the first traffic information is location information and status information of a traffic signal light S, where the status information herein is that remaining duration in which the traffic signal light S keeps staying in red is 45 seconds, the first TCU may generate, based on the received first traffic information and information processing duration, first traffic information such as information processing duration, including interaction coverage area determining duration, traffic participant object determining duration, a duration of information transmission with the traffic participant object, and the like. If the information processing duration is 5 s, the generated first traffic information is the location information of the traffic signal light S and the status information that the remaining duration of keeping a red light is 40 seconds.

Correspondingly, the traffic participant object receives the first traffic information of the traffic target object.

S302. The first TCU sends traffic environment information to the traffic participant object.

The first TCU may obtain the traffic environment information, and send the traffic environment information to the traffic participant object. The traffic environment information may include but is not limited to weather information, information about whether a traffic road is waterlogged, and the like. Optionally, the first TCU may obtain the weather information from a weather monitoring device, obtain the information about whether a traffic road is waterlogged from a road monitoring device, and the like.

Correspondingly, the traffic participant object receives the traffic environment information.

Optionally, the first TCU may further send traffic difference information that is different from the first traffic information to the traffic participant object, and the traffic difference information herein is not limited to the traffic environment information in step 302. In an optional implementation, after determining the first traffic information and the traffic difference information to be sent, the first TCU may send the first traffic information and the traffic difference information together to the traffic participant object at a time, or may separately send the first traffic information and the traffic difference information. This is not limited in this embodiment of the present invention.

S303. The traffic participant object sends a third message to the first TCU.

Correspondingly, the first TCU receives the third message, where the third message is used to indicate that the traffic participant object has acknowledged receiving of the first traffic information. The third message may be feedback for at least one of the first traffic information and the traffic environment information.

Figure 3B:
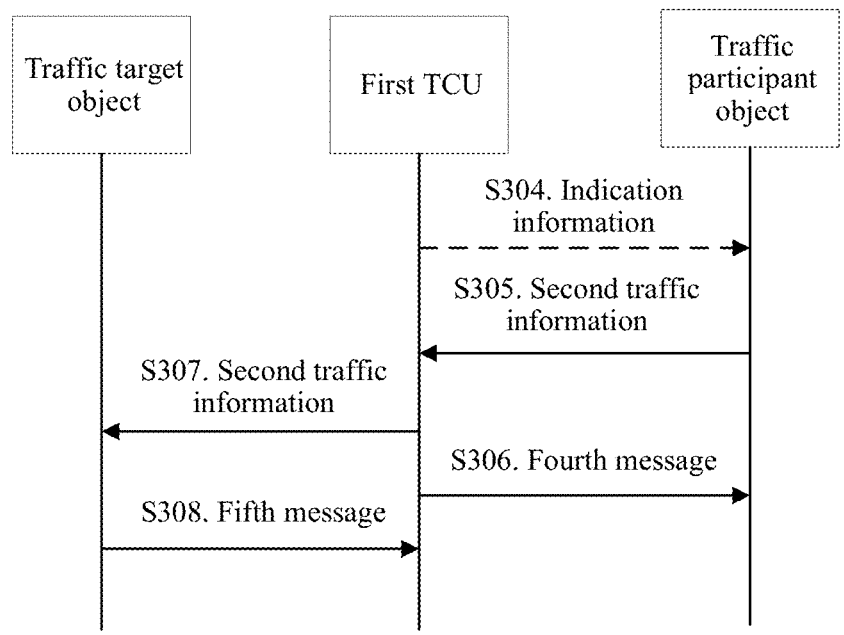
FIG. 3b is another schematic flowchart of interaction support provision according to an embodiment of the present invention.

FIG. 3b is another schematic flowchart of interaction support provision according to an embodiment of the present invention. In an implementation scenario in FIG. 3b, that the first TCU provides interaction support for the traffic participant object means that the first TCU collects the second traffic information of the traffic participant object and sends the second traffic information of the traffic participant object to the traffic target object. Specifically, the following steps S304 to S308 may be performed.

S305. The traffic participant object sends the second traffic information to the first TCU.

The traffic participant object may periodically report the second traffic information to the first TCU, or may send the second traffic information to the first TCU after sending indication information to the first TCU. This is not specifically limited herein. The traffic participant object may be a moving object (such as a moving vehicle) or may be a fixed object (such as a traffic signal light). The second traffic information may include location information or status information of the traffic participant object. The status information may include a direction, a speed, acceleration, an angular speed, and the like, and the status information may alternatively include phase status information, duration information, and the like, such as forward, stop and corresponding duration of the traffic signal light.

Optionally, S304 may be further included before S305.

S304. The first TCU sends the indication information to the traffic participant object.

By sending the indication information, the first TCU may enable the traffic participant object to feed back the second traffic information.

After S305, S306 to S308 may be further performed. It should be noted that S306 and S307 are performed in no particular order.

S306. The first TCU sends fourth information to the traffic participant object.

After receiving the second traffic information, the first TCU may send the fourth message to the traffic participant object, where the fourth message is used to indicate that the first TCU has acknowledged receiving of the second traffic information.

Correspondingly, the traffic participant object receives the fourth message to acknowledge that the first TCU has received the second traffic information.

S307. The first TCU sends the second traffic information to the traffic target object.

The first TCU may send the second traffic information received from the traffic participant object to the traffic target object, so that the traffic target object effectively uses the information. For example, it is assumed that the traffic target object is a first vehicle at an intersection that has a high collision occurrence rate, and the traffic participant object is a second vehicle within a specific distance from the first vehicle. To reduce a collision, the first TCU may send location information and status information of the second vehicle to the first vehicle, so that a user of the first vehicle can learn information about another vehicle at the intersection, and may further adjust driving behavior of the user based on an actual requirement.

Further, when the first TCU receives the traffic application type and the first traffic information of the traffic target object that are sent by the third TCU adjacent to the first TCU, the first TCU may send the second traffic information to the traffic target object by using the third TCU. If the third TCU receives the traffic application type and the first traffic information of the traffic target object that are sent by a fourth TCU adjacent to the third TCU, the third TCU may further send the second traffic information to the traffic target object by using the fourth TCU.

S308. The traffic target object sends a fifth message to the first TCU.

After receiving the second traffic information, the traffic target object may send the fifth message to the first TCU, where the fifth message is used to indicate that the traffic target object has acknowledged receiving of the second traffic information.

Correspondingly, the first TCU receives the fifth message to determine that the traffic target object has received the second traffic information.

The following uses some actual application scenarios as examples to describe the traffic information processing method in the embodiments of the present invention.

In the implementation scenario in FIG. 3a, the interaction support provided by the first TCU for the traffic participant object is sending the first traffic information of the traffic target object to the traffic participant object, where the traffic target object may be a fixedly deployed object or a relatively fixed object, or a moving object.

The traffic signal light information notification application type is used as an example to describe a traffic information processing method of a fixedly deployed traffic target object.

Figure 4:
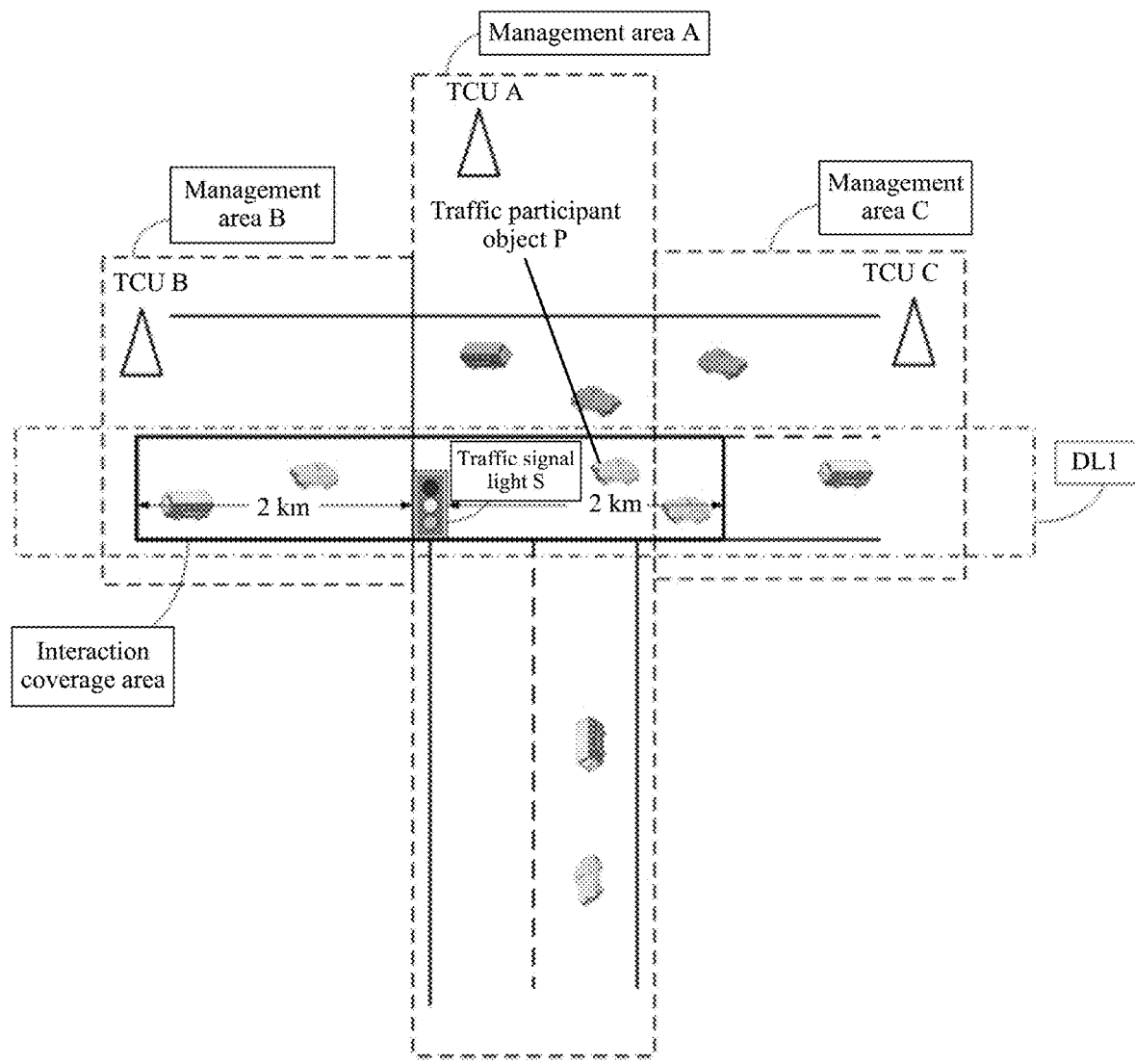
FIG. 4 is an example diagram of a traffic scenario of a notification application type of traffic signal light information according to an embodiment of the present invention.

As shown in FIG. 4, the first TCU is a TCU A, and a management area for which the TCU A is responsible is a management area A, and a traffic signal light S is fixedly deployed in the area for which the TCU A is responsible. A control unit of the traffic signal light S sends, initiatively or as requested by the TCU A, information about the traffic signal light S (namely, the first traffic information in the foregoing embodiment) to the TCU A. The information about the traffic signal light S may include an identifier, location information, and current phase status information of the traffic signal light S. The phase status information may include a current signal type, such as pass, stop, slow down, limit a speed, or turn, and remaining duration of a current signal. The TCU A may send, to the control unit of the traffic signal light S, a message used to indicate that the TCU A has acknowledged receiving of the information about the traffic signal light S.

The information about the traffic signal light S triggers the TCU A to determine, based on the information about the traffic signal light S, the traffic application type, and the traffic signal light S is used as the traffic target object. Based on the traffic signal light information notification application type and the information about the traffic signal light S, and with reference to map information, the TCU A determines an interaction coverage area corresponding to the traffic signal light information notification application type. It is assumed that the traffic signal light information notification application type indicates that an area within 2 km from a traffic signal light on a road controlled by the traffic signal light is used as the interaction coverage area. In this case, the TCU A may use a location of the traffic signal light S as a start point, and use an area within S2 km from the traffic signal light S in a road area DL1 shown in FIG. 4 controlled by the traffic signal light S as an interaction coverage area for the traffic signal light information notification application type.

It can be seen that there is an overlapping area between the management area A of the TCU A and the interaction coverage area, that is, the first area exists, and the TCU A further determines a traffic participant object P (the vehicle in FIG. 4) that is actually related to the interaction coverage area and that is in the management area A of the TCU A. Based on the traffic signal light information notification application type, the interaction support method used by the TCU A is sending the information about the traffic signal light S to the traffic participant object P, so that the traffic participant object P can take an action based on the traffic signal light S, for example, pass, stop, turn, or adjust a speed. The traffic participant object P may send, to the TCU A, a message used to indicate that the traffic participant object P has acknowledged receiving of the information about the traffic signal light S.

Further, if the TCU A may determine that an area that does not overlap the management area A of the TCU A exists in the interaction coverage area, that is, the second area exists, the TCU A may directly determine an adjacent TCU B and an adjacent TCU C as the second TCUs, or when management areas corresponding to the TCU B and the TCU C are known, determine that there is an overlapping area between each of the management areas corresponding to the TCU B and the TCU C and the interaction coverage area, that is, determine that second TCUs related to the interaction coverage area are the TCU B and the TCU C.

The TCU A sends the traffic application type and the first traffic information of the traffic target object to the TCU B and the TCU C. When receiving the traffic application type and the first traffic information of the traffic target object that are sent by the TCU A, the TCU B or the TCU C processes the traffic application type and the first traffic information of the traffic target object. The TCU B or the TCU C may return, to the TCU A, a message used to indicate that the TCU B or the TCU C has acknowledged receiving of the traffic application type and the first traffic information of the traffic target object. A process in which the TCU B and the TCU C process the traffic application type and the first traffic information of the traffic target object is the same as the foregoing processing process of the TCU A, but the TCU B or the TCU C no longer sends the traffic application type and the first traffic information of the traffic target object to the TCU A.

Similarly, in an in-vehicle label display application, a fixedly deployed traffic sign is used as the traffic target object, and a control unit of the traffic sign sends traffic sign information to a TCU. The interaction coverage area includes an area on a road controlled by the traffic sign and within a specific distance or a specific quantity of intersections from the traffic sign. The TCU sends the traffic sign information to the traffic participant object in the interaction coverage area, so that the traffic participant object can perform in-vehicle display after receiving the traffic sign information.

In a congestion-ahead reminder application type, an unexpected congestion report point is used as the traffic target object, and congestion report information is sent to a TCU by a nearby roadside monitoring device or a vehicle, a vehicle user, or a pedestrian that passes by. The interaction coverage area includes an area on a road around the congestion report point, in a direction towards the congestion report point, and within a specific distance or a specific quantity of intersections from the congestion report point. The TCU sends the congestion report information to the traffic participant object in the interaction coverage area, so that the traffic participant object can adjust a forward path after receiving the congestion report information.

In a dangerous obstacle warning application type, an unexpected obstacle appearing on a road is used as the traffic target object, and road obstacle information is sent to a TCU by a nearby roadside monitoring device or a vehicle, a vehicle user, or a pedestrian that passes by. The interaction coverage area includes an area on a road on which the obstacle is located, in a direction towards the obstacle, and within a specific distance or a specific quantity of intersections from the obstacle. The TCU sends the road obstacle information to the traffic participant object in the interaction coverage area, so that after receiving the road obstacle information, the traffic participant object can be on guard against the obstacle when moving forward.

An emergency vehicle reminder application type is used as an example to describe a traffic information processing method of a moving traffic target object.

It is assumed that the first TCU is a TCU A, and an emergency vehicle E moves in a management area A corresponding to the TCU A. After discovering the emergency vehicle E, the emergency vehicle E itself or a nearby roadside monitoring device sends information about the emergency vehicle E (namely, the first traffic information in the foregoing embodiment) to the TCU A. The information about the emergency vehicle E may include an identifier, a current location, and a motion status of the emergency vehicle E. The motion status may include a direction, a speed, acceleration, an angular speed, and the like. The TCU A may return, to the emergency vehicle E or the nearby roadside monitoring device, a message used to indicate that the TCU A has acknowledged receiving of the information about the emergency vehicle E.

The information about the emergency vehicle E triggers the TCU A to determine, based on the information about the emergency vehicle E, the traffic application type, and the traffic target object is the emergency vehicle E. The TCU A determines the interaction coverage area based on the emergency vehicle reminder application type and the information about the emergency vehicle E with reference to map information. The interaction coverage area includes an area on a road on which the emergency vehicle E is driving forward and within a specific distance (for example, 300 m) from a current location of the emergency vehicle E. The TCU A determines the second TCU related to the interaction coverage area based on the interaction coverage area with reference to an area, learned by the TCU A, for which the TCU is responsible.

If there is an overlapping area between the management area A of the TCU A and the interaction coverage area, that is, the first area exists, the TCU A further determines that a traffic participant object P that is actually related to the interaction coverage area and that is in the management area corresponding to the TCU A, and the traffic participant object P may be a vehicle, a vehicle user, and/or a roadside infrastructure. Based on the emergency vehicle reminder application type, the interaction support method used by the TCU A may be sending the information about the emergency vehicle E to the traffic participant object P, so that the traffic participant object P provides convenience for the emergency vehicle E to move forward, for example, a vehicle on a road ahead of the moving emergency vehicle E gives way to the emergency vehicle E, or a roadside infrastructure, such as a traffic signal light, on the road ahead of the moving emergency vehicle E adjusts a phase status for the emergency vehicle E. The traffic participant object P may return, to the TCU A, a message used to indicate that the traffic participant object P has acknowledged receiving of the information about the emergency vehicle E.

Further, if the TCU A determines that there is an area that does not overlap the management area A of the TCU A in the interaction coverage area, that is, the second area exists, the TCU A may directly determine an adjacent TCU as the second TCU, or when a management area corresponding to the adjacent TCU is known, determine the second TCU whose management area overlaps the interaction coverage area.

The TCU A sends the traffic application type and the first traffic information of the traffic target object to the second TCU. When receiving the traffic application type and the first traffic information of the traffic target object that are sent by the TCU A, the second TCU processes the traffic application type and the first traffic information of the traffic target object. The second TCU may return, to the TCU A, a message used to indicate that the second TCU has acknowledged receiving of the traffic application type and the first traffic information of the traffic target object. A process in which the second TCU processes the traffic application type and the first traffic information of the traffic target object is the same as the foregoing processing process of the TCU A, but the second TCU no longer sends the traffic application type and the first traffic information of the traffic target object to the TCU A.

Similarly, in an abnormal vehicle alarm application type, an unexpected abnormal vehicle that may be moving is used as the traffic target object, and abnormal-vehicle information is sent to a TCU by the abnormal vehicle, a nearby roadside monitoring device, or a vehicle, a vehicle user, or a pedestrian that passes by. The interaction coverage area includes an area on a road behind the driving abnormal vehicle and within a specific distance from the abnormal vehicle. The TCU sends the abnormal-vehicle information to the traffic participant object in the interaction coverage area, so that after receiving the abnormal vehicle information, the traffic participant object can be on guard against a collision with the abnormal vehicle when moving forward.

In a vulnerable traffic participant object warning application type, an unexpected vulnerable traffic participant object that may be moving (for example, a pedestrian or a rider) is used as the traffic target object, and vulnerable traffic participant object information is sent to a TCU by the vulnerable traffic participant object, a nearby roadside monitoring device, or a vehicle, a vehicle user, or a pedestrian that passes by. The interaction coverage area includes an area on a road around the vulnerable traffic participant object, in a direction towards the vulnerable traffic participant object, and within a specific distance from the vulnerable traffic participant object. The TCU sends the vulnerable traffic participant object information to the traffic participant object in the interaction coverage area, so that after receiving the vulnerable traffic participant object information, the traffic participant object can be on guard against a collision with the vulnerable traffic participant object when moving forward, moving backward, or making a turn.

In the implementation scenario in FIG. 3b, the interaction support provided by the first TCU for the traffic participant object is collecting the second traffic information of the traffic participant object and sending the second traffic information to the traffic target object.

A dead zone article warning application type is used as an example to describe a traffic information processing method in the implementation scenario in FIG. 3b.

A target vehicle V is moving in a management area A corresponding to a TCU A.

When the target vehicle V sends a dead zone article warning information request to the TCU A, the TCU obtains information about the target vehicle V and determines the corresponding dead zone article warning application type based on a request type of the dead zone article warning information request. The target vehicle V is used as the traffic target object. The target vehicle V sends the information about the target vehicle V (namely, the first traffic information in the foregoing embodiment) to the TCU A. The information about the target vehicle V may include an identifier, a current location, and a motion status of the target vehicle V. The motion status may include a direction, a speed, acceleration, an angular speed, and the like.

The TCU A determines the interaction coverage area based on the dead zone article warning application type and the information about the target vehicle V with reference to map information. The interaction coverage area includes an area near the target vehicle V, in a direction that cannot be observed from the target vehicle V, and within a specific distance (for example, 100 m) from the target vehicle V. The TCU A determines the second TCU related to the interaction coverage area based on the interaction coverage area with reference to an area, learned by the TCU A, for which the TCU is responsible.

If there is an overlapping area between the management area A of the TCU A and the interaction coverage area, that is, the first area exists, the TCU A further determines that a traffic participant object P that actually related to the management area corresponding to the TCU A may be a moving or fixed article. After finding a request from the traffic participant object P or the TCU A to the traffic participant object, the traffic participant object P or a nearby roadside monitoring device sends information about the traffic participant object P (namely, the second traffic information in the foregoing embodiment) to the TCU A. The information about the traffic participant object P may include a location and a motion status of the traffic participant object P. The motion status may include a direction, a speed, acceleration, an angular speed, and the like. The TCU A sends the information about the traffic participant object P to the target vehicle V, so that the target vehicle V learns an article in a dead zone of the target vehicle V and keeps on guard against a collision with the article, for example, the target vehicle V corrects or abandons a movement to the dead zone. The target vehicle V may return, to the TCU, a message used to indicate that the target vehicle V has acknowledged receiving of the information about the traffic participant object P.

Further, if the TCU A determines that there is an area that does not overlap the management area A of the TCU A in the interaction coverage area, that is, the second area exists, the TCU A may directly determine an adjacent TCU as the second TCU, or when a management area corresponding to the adjacent TCU is known, determine the second TCU whose management area overlaps the interaction coverage area.

The TCU A sends the traffic application type and the first traffic information of the traffic target object to the second TCU. When receiving the traffic application type and the first traffic information of the traffic target object that are sent by the TCU A, the second TCU processes the traffic application type and the first traffic information of the traffic target object. The second TCU may return, to the TCU A, a message used to indicate that the second TCU has acknowledged receiving of the dead zone article warning application type and the information about the target vehicle V. A process in which the second TCU processes the traffic application type and the first traffic information of the traffic target object is the same as the foregoing processing process of the TCU A, but the second TCU no longer sends the traffic application type and the first traffic information of the traffic target object to the TCU A.

Similarly, in an intersection collision warning application type, a moving target vehicle is used as the traffic target object, and the target vehicle sends a current location and motion status information of the target vehicle to a TCU. The interaction coverage area includes an area in a range of an intersection ahead of the driving target vehicle and within a specific distance from the target vehicle. Other vehicles in various directions in the area whose tracks may intersect with the target vehicle are used as the traffic participant objects. After receiving a current location and motion status information of a vehicle used as a traffic participant object, the target vehicle may be on guard against a collision with the vehicle when driving through the intersection.

The foregoing mainly describes solutions provided in the embodiments of the present invention from a perspective of interaction between different network elements. It can be understood that, to implementation the foregoing functions, other TCUs such as the first TCU, the second TCU, and the third TCU each include a corresponding hardware structure and/or software module for performing the functions. With reference to the units and algorithm steps described in the embodiments disclosed in the present invention, the embodiments of the present invention can be implemented in a form of hardware or hardware and computer software. Whether a function is performed by hardware or hardware driven by computer software depends on particular applications and design constraints of the technical solutions. A person skilled in the art may use different methods to implement the described functions for each particular application.

In the embodiments of the present invention, the first TCU, the second TCU, and the third TCU may be divided into function modules or function units based on the foregoing method examples. For example, the function modules or the function units may be obtained by using division based on the corresponding functions, or two or more functions may be integrated into one processing module or processing unit. The integrated modules or units may be implemented in a form of hardware, or may be implemented in a form of a software functional module. It should be noted that, in the embodiments of the present invention, module or unit division is an example, and is merely logical function division. In actual implementation, another division manner may be used. For details, refer to the following specific descriptions.

Figure 5:
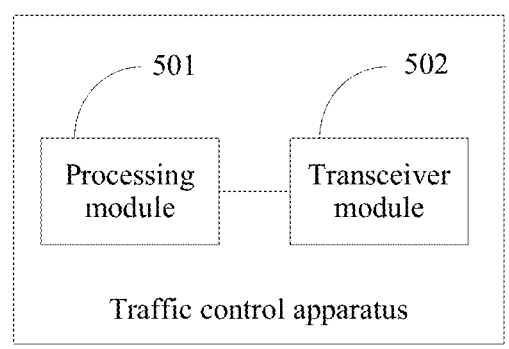
FIG. 5 is a schematic structural diagram of a traffic control apparatus according to an embodiment of the present invention.

FIG. 5 is a schematic structural diagram of a traffic control apparatus according to an embodiment of the present invention. The traffic control apparatus may be a first TCU, configured to implement the first TCU in the embodiment in FIG. 2. As shown in FIG. 5, the first TCU includes:

a processing module 501, configured to: obtain a traffic application type and first traffic information of a traffic target object, where the traffic application type is used to indicate a to-be-processed traffic scenario; determine an interaction coverage area based on the traffic application type and the first traffic information of the traffic target object, where the interaction coverage area is used to indicate a geographical area related to the to-be-processed traffic scenario; determine a first area based on the interaction coverage area and a management area of the first TCU, where the first area is an area in which the management area of the first TCU overlaps the interaction coverage area; and determine a traffic participant object in the first area; and a transceiver module 502, configured to send the first traffic information of the traffic target object to the traffic participant object; or receive second traffic information sent by the traffic participant object, and send the second traffic information to the traffic target object.

Optionally, the processing module 501 is further configured to:

determine a second area based on the interaction coverage area and the management area of the first TCU, where the second area is an area that does not overlap the management area of the first TCU and that is in the interaction coverage area; and the transceiver module 502 is further configured to:

send the traffic application type and the first traffic information of the traffic target object to a TCU adjacent to the first TCU.

Optionally, the processing module 501 is further configured to:

determine a second area based on the interaction coverage area and the management area of the first TCU, where the second area is an area that does not overlap the management area of the first TCU and that is in the interaction coverage area; and the transceiver module 502 is further configured to:

send the traffic application type and the first traffic information of the traffic target object to a second TCU, where the second TCU is a TCU in TCUs adjacent to the first TCU, and there is an overlapping area between a management area of the TCU and the interaction coverage area.

Optionally, the processing module 501 is further configured to:

obtain an identifier of the TCU adjacent to the first TCU.

Optionally, the processing module 501 is further configured to:

obtain an identifier and the management area of the TCU adjacent to the first TCU.

Optionally, the transceiver module 502 is further configured to:

receive a first message sent by the TCU adjacent to the first TCU, where the first message is used to indicate that the TCU adjacent to the first TCU has acknowledged receiving of the traffic application type and the first traffic information of the traffic target object.

Optionally, the transceiver module 502 is further configured to:

receive a second message sent by the second TCU, where the second message is used to indicate that the second TCU has acknowledged receiving of the traffic application type and the first traffic information of the traffic target object.

Optionally, the processing module 501 is specifically configured to:

obtain the first traffic information of the traffic target object and the traffic application type based on a preset condition;

receive the first traffic information of the traffic target object, and determine the traffic application type based on the first traffic information of the traffic target object; or determine the first traffic information of the traffic target object and the traffic application type based on a received traffic application request of the traffic target object, where the traffic application request includes the first traffic information of the traffic target object and a request type, and the request type is used to indicate the traffic application type.

Optionally, the processing module 501 is specifically configured to:

receive the traffic application type and the first traffic information of the traffic target object that are sent by a third TCU adjacent to the first TCU; and the transceiver module 502 is specifically configured to:

send the traffic application type and the first traffic information of the traffic target object to a TCU, other than the third TCU, adjacent to the first TCU.

Optionally, the processing module 501 is specifically configured to:

receive the traffic application type and the first traffic information of the traffic target object that are sent by the third TCU adjacent to the first TCU; and the transceiver module 502 is specifically configured to:

send the traffic application type and the first traffic information of the traffic target object to the second TCU other than the third TCU.

Optionally, the transceiver module 502 is specifically configured to:

receive the second traffic information sent by the traffic participant object; and send the second traffic information to the traffic target object by using the third TCU.

The first traffic information of the traffic target object includes location information of the traffic target object; or the first traffic information of the traffic target object includes location information and status information of the traffic target object.

Optionally, the location information of the traffic target object is a current location of the traffic target object; and the processing module 501 is specifically configured to:

determine, as the interaction coverage area based on the traffic application type and map information, a geographical area within a first distance threshold, with the current location of the traffic target object as a start point, where the first distance threshold is determined based on the traffic application type.

The processing module 501 is specifically configured to:

determine a communication-enabled object that appears in the first area within a preset time as the traffic participant object.

Optionally, the transceiver module 502 is further configured to:

receive a third message sent by the traffic participant object, where the third message is used to indicate that the traffic participant object has acknowledged receiving of the first traffic information of the traffic target object.

The transceiver module 502 is further configured to:

send a fourth message to the traffic participant object, where the fourth message is used to indicate that the first TCU has acknowledged receiving of the second traffic information.

Optionally, the transceiver module 502 is further configured to:

send indication information to the traffic participant object, where the indication information is used to instruct the traffic participant object to send the second traffic information to the first TCU.

Optionally, the second traffic information includes location information of the traffic participant object; or the second traffic information includes location information and status information of the traffic participant object.

It can be understood that, for specific implementations and corresponding beneficial effects of function blocks included in the traffic control apparatus in FIG. 5, refer to specific descriptions of the foregoing embodiment in FIG. 2. Details are not described herein again.

Figure 6:
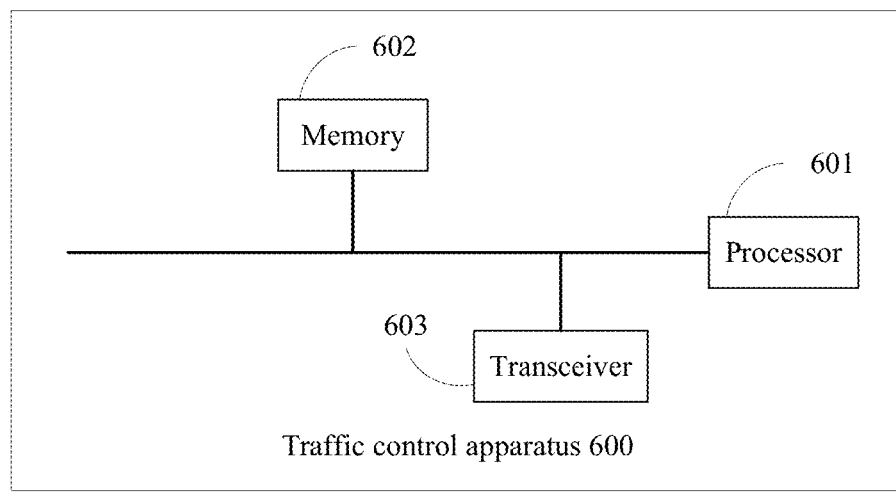
FIG. 6 is a schematic structural diagram of another traffic control apparatus according to an embodiment of the present invention.

The traffic control apparatus in the embodiment shown in FIG. 5 may be implemented by using a traffic control apparatus 600 shown in FIG. 6. FIG. 6 is a schematic structural diagram of another traffic control apparatus according to an embodiment of the present invention. The traffic control apparatus 600 shown in FIG. 6 includes: a processor 601 and a transceiver 603, where the transceiver 603 is configured to support information transmission between the traffic control apparatus 600 and the traffic target object or another traffic control apparatus in the foregoing embodiment. For example, the transceiver 603 is configured to implement an action performed by any transceiver module 502 in FIG. 5, and the processor 601 is configured to implement an action performed by any processing module 501 in FIG. 5. The processor 601 is connected to the transceiver 603 for communication, for example, by using a bus. The traffic control apparatus 600 may further include a memory 602. The memory 602 is configured to store program code and data that are executed by the traffic control apparatus 600, and the processor 601 is configured to execute the application program code stored in the memory 602, to implement the action of the traffic control apparatus provided in the embodiments shown in FIG. 2 to FIG. 4.

It should be noted that in actual application, the traffic control apparatus may include one or more processors. A structure of the traffic control apparatus 600 does not impose a limitation on the embodiments of the present invention.

The processor 601 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 602 may include a volatile memory (volatile memory), for example, a random access memory (RAM). Alternatively, the memory 602 may include a non-volatile memory, for example, a read-only memory (ROM), a flash memory (flash memory), a hard disk drive (HDD), or a solid-state drive (SSD). Alternatively, the memory 602 may include a combination of the foregoing types of memories.

An embodiment of the present invention further provides a computer storage medium, and the computer storage medium may be configured to store a computer software instruction used by the traffic control apparatus in the embodiment shown in FIG. 5. The computer storage medium includes a program designed for the traffic control apparatus to execute the method in the foregoing embodiment. The storage medium includes but is not limited to a flash memory, a hard disk, and a solid-state drive.

An embodiment of the present invention further provides a computer program product. When the computer product is run by a computing device, the computer program product may perform the communication method designed for the traffic control apparatus in the embodiment in FIG. 5.

In the specification, claims, and accompanying drawings of the present invention, the terms "first", "second", "third", "fourth", and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

A person of ordinary skill in the art may understand that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The storage medium may include: a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A traffic information processing method comprising:
   obtaining, by a first traffic control unit (TCU), a traffic application type and first traffic information of a traffic target object, wherein the traffic application type is used to indicate a to-be-processed traffic scenario;
   determining, by the first TCU, an interaction coverage area based on the traffic application type and the first traffic information of the traffic target object, wherein the interaction coverage area is used to indicate a geographical area related to the to-be-processed traffic scenario;
   determining, by the first TCU, a first area based on the interaction coverage area and a management area of the first TCU, wherein the first area is an area in which the management area of the first TCU overlaps with the interaction coverage area;
   determining, by the first TCU, a traffic participant object in the first area; and
   at least one of:
       sending, by the first TCU, the first traffic information of the traffic target object to the traffic participant object; and
       receiving, by the first TCU, second traffic information sent by the traffic participant object, and sending the second traffic information to the traffic target object.

2. The method according to claim 1, wherein the method further comprises:
   determining, by the first TCU, a second area based on the interaction coverage area and the management area of the first TCU, wherein the second area is an area that does not overlap with the management area of the first TCU and that is in the interaction coverage area; and
   sending, by the first TCU, the traffic application type and the first traffic information of the traffic target object to a TCU adjacent to the first TCU.

3. The method according to claim 1, wherein the method further comprises:
   determining, by the first TCU, a second area based on the interaction coverage area and the management area of the first TCU, wherein the second area is an area that does not overlap with the management area of the first TCU and that is in the interaction coverage area; and
   sending, by the first TCU, the traffic application type and the first traffic information of the traffic target object to a second TCU, wherein the second TCU is a TCU in TCUs adjacent to the first TCU, and there is an overlapping area between a management area of the TCU and the interaction coverage area.

4. The method according to claim 2, wherein before the sending, by the first TCU, the traffic application type and the first traffic information of the traffic target object to a TCU adjacent to the first TCU, the method further comprises:
   obtaining, by the first TCU, an identifier of the TCU adjacent to the first TCU.

5. The method according to claim 3, wherein before the sending, by the first TCU, the traffic application type and the first traffic information of the traffic target object to a second TCU, the method further comprises:
   obtaining, by the first TCU, an identifier and the management area of the TCU adjacent to the first TCU.

6. The method according to claim 2, wherein after the sending, by the first TCU, the traffic application type and the first traffic information of the traffic target object to a TCU adjacent to the first TCU, the method further comprises:
   receiving, by the first TCU, a first message sent by the TCU adjacent to the first TCU, wherein the first message is used to indicate that the TCU adjacent to the first TCU has acknowledged receiving of the traffic application type and the first traffic information of the traffic target object.

7. The method according to claim 3, wherein after the sending, by the first TCU, the traffic application type and the first traffic information of the traffic target object to a second TCU, the method further comprises:
   receiving, by the first TCU, a second message sent by the second TCU, wherein the second message is used to indicate that the second TCU has acknowledged receiving of the traffic application type and the first traffic information of the traffic target object.

8. The method according to claim 1, wherein the obtaining, by a first traffic control unit TCU, a traffic application type and first traffic information of a traffic target object comprises:
obtaining, by the first TCU, the first traffic information of the traffic target object and the traffic application type based on a preset condition; and
at least one of:
receiving, by the first TCU, the first traffic information of the traffic target object, and determining the traffic application type based on the first traffic information of the traffic target object; and
determining, by the first TCU, the first traffic information of the traffic target object and the traffic application type based on a received traffic application request of the traffic target object, wherein the traffic application request comprises the first traffic information of the traffic target object and a request type, and the request type is used to indicate the traffic application type.

9. The method according to claim 2, wherein the obtaining, by a first traffic control unit TCU, a traffic application type and first traffic information of a traffic target object comprises:
receiving, by the first TCU, the traffic application type and the first traffic information of the traffic target object that are sent by a third TCU adjacent to the first TCU; and
the sending, by the first TCU, the traffic application type and the first traffic information of the traffic target object to a TCU adjacent to the first TCU comprises:
sending, by the first TCU, the traffic application type and the first traffic information of the traffic target object to a TCU, other than the third TCU, adjacent to the first TCU.

10. The method according to claim 3, wherein the obtaining, by a first traffic control unit TCU, a traffic application type and first traffic information of a traffic target object comprises:
receiving, by the first TCU, the traffic application type and the first traffic information of the traffic target object that are sent by a third TCU adjacent to the first TCU; and
the sending, by the first TCU, the traffic application type and the first traffic information of the traffic target object to a second TCU comprises:
sending, by the first TCU, the traffic application type and the first traffic information of the traffic target object to the second TCU other than the third TCU.

11. A traffic control apparatus, wherein the traffic control apparatus is a first traffic control unit (TCU) and comprises:
a processing module, configured to: obtain a traffic application type and first traffic information of a traffic target object, wherein the traffic application type is used to indicate a to-be-processed traffic scenario; determine an interaction coverage area based on the traffic application type and the first traffic information of the traffic target object, wherein the interaction coverage area is used to indicate a geographical area related to the to-be-processed traffic scenario; determine a first area based on the interaction coverage area and a management area of the first TCU, wherein the first area is an area in which the management area of the first TCU overlaps with the interaction coverage area; and determine a traffic participant object in the first area; and
a transceiver module, configured to one of: send, in coordination with the processing module, the first traffic information of the traffic target object to the traffic participant object; and receive second traffic information sent by the traffic participant object, and send the second traffic information to the traffic target object.

12. The traffic control apparatus according to claim 11, wherein
the processing module is further configured to:
determine a second area based on the interaction coverage area and the management area of the first TCU, wherein the second area is an area that does not overlap with the management area of the first TCU and that is in the interaction coverage area; and
the transceiver module is further configured to:
send the traffic application type and the first traffic information of the traffic target object to a TCU adjacent to the first TCU.

13. The traffic control apparatus according to claim 11, wherein
the processing module is further configured to:
determine a second area based on the interaction coverage area and the management area of the first TCU, wherein the second area is an area that does not overlap with the management area of the first TCU and that is in the interaction coverage area; and
the transceiver module is further configured to:
send the traffic application type and the first traffic information of the traffic target object to a second TCU, wherein the second TCU is a TCU in TCUs adjacent to the first TCU, and there is an overlapping area between a management area of the TCU and the interaction coverage area.

14. The traffic control apparatus according to claim 12, wherein the transceiver module is further configured to:
receive a first message sent by the TCU adjacent to the first TCU, wherein the first message is used to indicate that the TCU adjacent to the first TCU has acknowledged receiving of the traffic application type and the first traffic information of the traffic target object.

15. The traffic control apparatus according to claim 13, wherein the transceiver module is further configured to:
receive a second message sent by the second TCU, wherein the second message is used to indicate that the second TCU has acknowledged receiving of the traffic application type and the first traffic information of the traffic target object.

16. The traffic control apparatus according to claim 11, wherein the processing module is specifically configured to:
obtain the first traffic information of the traffic target object and the traffic application type based on a preset condition;
receive the first traffic information of the traffic target object, and determine the traffic application type based on the first traffic information of the traffic target object; or
determine the first traffic information of the traffic target object and the traffic application type based on a received traffic application request of the traffic target object, wherein the traffic application request comprises the first traffic information of the traffic target object and a request type, and the request type is used to indicate the traffic application type.

17. The traffic control apparatus according to claim 11, wherein the first traffic information of the traffic target object comprises location information of the traffic target object; or the first traffic information of the traffic target object comprises location information and status information of the traffic target object.

18. The traffic control apparatus according to claim 17, wherein the location information of the traffic target object is a current location of the traffic target object; and the processing module is specifically configured to:
determine, as the interaction coverage area based on the traffic application type and map information, a geographical area within a first distance threshold, with the current location of the traffic target object as a start point, wherein the first distance threshold is determined based on the traffic application type.

19. The traffic control apparatus according to claim 11, wherein the transceiver module is further configured to:

receive a third message sent by the traffic participant object, wherein the third message is used to indicate that the traffic participant object has acknowledged receiving of the first traffic information of the traffic target object.

20. A non-transitory computer readable storage medium, storing instructions that when executed by a computing device, cause the computing device to execute a traffic information processing method comprising:

obtaining, by a first traffic control unit (TCU), a traffic application type and first traffic information of a traffic target object, wherein the traffic application type is used to indicate a to-be-processed traffic scenario;

determining, by the first TCU, an interaction coverage area based on the traffic application type and the first traffic information of the traffic target object, wherein the interaction coverage area is used to indicate a geographical area related to the to-be-processed traffic scenario;

determining, by the first TCU, a first area based on the interaction coverage area and a management area of the first TCU, wherein the first area is an area in which the management area of the first TCU overlaps with the interaction coverage area;

determining, by the first TCU, a traffic participant object in the first area; and at least one of:
sending, by the first TCU, the first traffic information of the traffic target object to the traffic participant object; and receiving, by the first TCU, second traffic information sent by the traffic participant object, and sending the second traffic information to the traffic target object.

* * * * *